United States Patent
Kitagawa

(10) Patent No.: US 6,803,949 B1
(45) Date of Patent: *Oct. 12, 2004

(54) IMAGE SENSING APPARATUS AND METHOD

(75) Inventor: Eiichiro Kitagawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 981 days.

(21) Appl. No.: 08/768,787

(22) Filed: Dec. 17, 1996

(30) Foreign Application Priority Data

Dec. 27, 1995 (JP) .............................................. 7-341814
Dec. 27, 1995 (JP) .............................................. 7-341815

(51) Int. Cl.[7] ................................................ H04N 9/73
(52) U.S. Cl. ................................ 348/223.1; 348/222.1; 348/342
(58) Field of Search ............................ 348/202, 223.1, 348/272, 273, 279, 218.1, 219.1, 222.1, 342

(56) References Cited

U.S. PATENT DOCUMENTS

| | | | | |
|---|---|---|---|---|
| 4,906,985 A | * | 3/1990 | Furlong | 340/799 |
| 5,164,825 A | * | 11/1992 | Kobayashi et al. | 358/160 |
| 5,196,929 A | * | 3/1993 | Miyasaka | 358/125 |
| 5,585,856 A | * | 12/1996 | Nakaya et al. | 348/441 |
| 5,781,236 A | * | 7/1998 | Shinbori et al. | 348/342 |

* cited by examiner

Primary Examiner—Wendy R. Garber
Assistant Examiner—Jacqueline Wilson
(74) Attorney, Agent, or Firm—Morgan & Finnegan, L.L.P.

(57) ABSTRACT

In an image sensing apparatus which senses a plurality of color images for obtaining a single color image or black-and-white image of high resolution by combining the sensed images, a color image/black-and-white image determination unit determines whether a sensed image is a black-and-white image or a color image. When it is determined that the sensed image is a black-and-white image, a pixel shifting method of shifting by half pixel for increasing a resolution is performed. Accordingly, the number of times to sense images is reduced, thereby shortening a period of time required for sensing a black-and-white image of high resolution by using a single CCD type color image sensor.

39 Claims, 22 Drawing Sheets

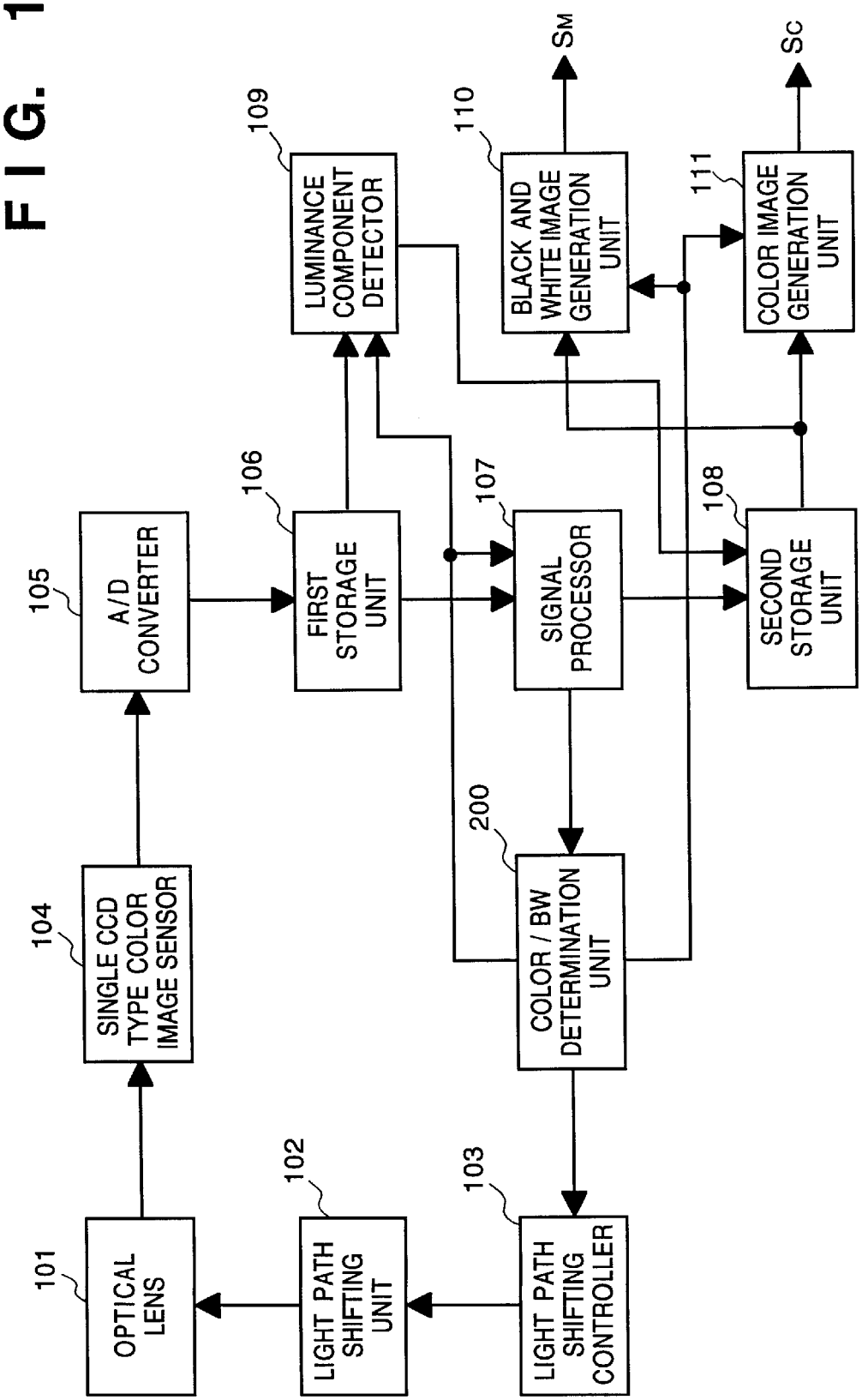

FIG. 7A

| Mg | Gr | Mg | Gr |
|----|----|----|----|
| Cy | Ye | Cy | Ye |
| Gr | Mg | Gr | Mg |
| Cy | Ye | Cy | Ye |

FIG. 7B

| Mg | Gr | Mg | Gr |
|----|----|----|----|
| Cy | Ye | Cy | Ye |
| Gr | Mg | Gr | Mg |
| Cy | Ye | Cy | Ye |

FIG. 7D

| Mg | Gr | Mg | Gr |
|----|----|----|----|
| Cy | Ye | Cy | Ye |
| Gr | Mg | Gr | Mg |
| Cy | Ye | Cy | Ye |

FIG. 7C

| Mg | Gr | Mg | Gr |
|----|----|----|----|
| Cy | Ye | Cy | Ye |
| Gr | Mg | Gr | Mg |
| Cy | Ye | Cy | Ye |

FIG. 7E

| Mg | Mg | Gr | Gr | Mg | Mg | Gr | Gr |
|----|----|----|----|----|----|----|----|
| Mg | Mg | Gr | Gr | Mg | Mg | Gr | Gr |
| Cy | Cy | Ye | Ye | Cy | Cy | Ye | Ye |
| Cy | Cy | Ye | Ye | Cy | Cy | Ye | Ye |
| Gr | Gr | Mg | Mg | Gr | Gr | Mg | Mg |
| Gr | Gr | Mg | Mg | Gr | Gr | Mg | Mg |
| Cy | Cy | Ye | Ye | Cy | Cy | Ye | Ye |
| Cy | Cy | Ye | Ye | Cy | Cy | Ye | Ye |

F I G. 15A

| Mg | Gr | Mg | Gr | Mg | Gr |
|---|---|---|---|---|---|
| Cy | Ye | Cy | Ye | Cy | Ye |
| Gr | Mg | Gr | Mg | Gr | Mg |
| Cy | Ye | Cy | Ye | Cy | Ye |
| Mg | Gr | Mg | Gr | Mg | Gr |

F I G. 15B

| Mg | Gr | Mg | Gr | Mg | Gr |
|---|---|---|---|---|---|
| Cy | Ye | Cy | Ye | Cy | Ye |
| Gr | Mg | Gr | Mg | Gr | Mg |
| Cy | Ye | Cy | Ye | Cy | Ye |
| Mg | Gr | Mg | Gr | Mg | Gr |

F I G. 15C

| Mg | Gr | Mg | Gr | Mg | Gr |
|---|---|---|---|---|---|
| Cy | Ye | Cy | Ye | Cy | Ye |
| Gr | Mg | Gr | Mg | Gr | Mg |
| Cy | Ye | Cy | Ye | Cy | Ye |
| Mg | Gr | Mg | Gr | Mg | Gr |

F I G. 15D

| Mg | Gr | Mg | Gr | Mg | Gr |
|---|---|---|---|---|---|
| Cy | Ye | Cy | Ye | Cy | Ye |
| Gr | Mg | Gr | Mg | Gr | Mg |
| Cy | Ye | Cy | Ye | Cy | Ye |
| Mg | Gr | Mg | Gr | Mg | Gr |

FIG. 16A
FIG. 16B
FIG. 16D
FIG. 16C

FIG. 17A
| Mg | Gr | Mg | Gr |
|----|----|----|----|
| Cy | Ye | Cy | Ye |
| Gr | Mg | Gr | Mg |
| Cy | Ye | Cy | Ye |
FIG. 17B
| Mg | Gr | Mg | Gr |
|----|----|----|----|
| Cy | Ye | Cy | Ye |
| Gr | Mg | Gr | Mg |
| Cy | Ye | Cy | Ye |
FIG. 17D
| Mg | Gr | Mg | Gr |
|----|----|----|----|
| Cy | Ye | Cy | Ye |
| Gr | Mg | Gr | Mg |
| Cy | Ye | Cy | Ye |
FIG. 17C
| Mg | Gr | Mg | Gr |
|----|----|----|----|
| Cy | Ye | Cy | Ye |
| Gr | Mg | Gr | Mg |
| Cy | Ye | Cy | Ye |

FIG. 18A

| Mg | Gr | Mg | Gr |
|----|----|----|----|
| Cy | Ye | Cy | Ye |
| Gr | Mg | Gr | Mg |
| Cy | Ye | Cy | Ye |

FIG. 18B

| Mg | Gr | Mg | Gr |
|----|----|----|----|
| Cy | Ye | Cy | Ye |
| Gr | Mg | Gr | Mg |
| Cy | Ye | Cy | Ye |

FIG. 18D

| Mg | Gr | Mg | Gr |
|----|----|----|----|
| Cy | Ye | Cy | Ye |
| Gr | Mg | Gr | Mg |
| Cy | Ye | Cy | Ye |

FIG. 18C

| Mg | Gr | Mg | Gr |
|----|----|----|----|
| Cy | Ye | Cy | Ye |
| Gr | Mg | Gr | Mg |
| Cy | Ye | Cy | Ye |

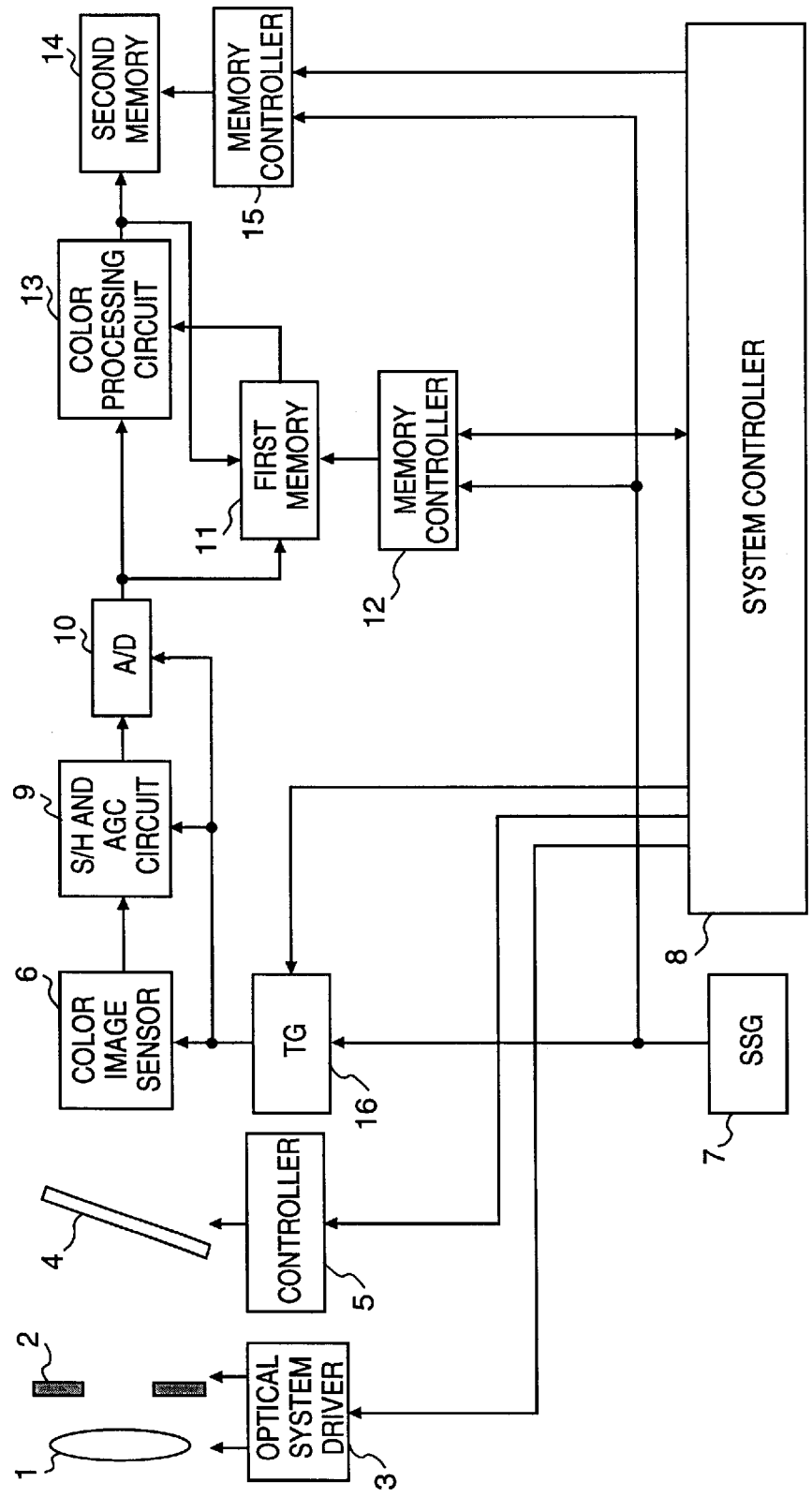

IMAGE SENSING APPARATUS AND METHOD

BACKGROUND OF THE INVENTION

The present invention relates to an image sensing apparatus and method and, more particularly, to an image sensing apparatus and method which obtains an image of high resolution by processing images of a document and a scene.

FIG. 20 is a block diagram illustrating a configuration of a conventional high resolution image sensing apparatus. In FIG. 20, reference numeral 1 denotes an optical lens; 2, an iris diaphragm; 3, an optical system driver; 4, a plane parallel plate, which is installed so as to be rotatable, for shifting the light path of an optical image; 5, a controller for controlling the plane parallel plate 4; and 6, a single CCD type color image sensor (simply referred as "color image sensor", hereinafter) which is provided with a complementary color mosaic filter (magenta, green, cyan and yellow).

Further, reference numeral 7 denotes a synchronizing signal generator (SSG); 8, a system controller for controlling the entire apparatus; 9, a sample-and-hold (S/H) and automatic gain control (AGC) circuit; 10, an analog-digital (A/D) converter; 11, a first memory for storing complementary color images; 12, -a memory controller for controlling the first memory 11; 13, a color processing circuit for converting the complementary color images to RGB color images; 14, a second memory for storing the RGB color images obtained by performing the color processing on the complementary color images by the color processing circuit 13; 15, a memory controller for controlling the second memory 14; and 16, a timing signal generator (TG).

Next, an operation of the image sensing apparatus having the aforesaid configuration will be briefly explained. Light incoming from outside passes through the optical lens 1, the iris diaphragm 2, then the plane parallel plate 4. The path of the light is shifted by the plane parallel plate 4, and an image is formed on the photosensing surface of the color image sensor 6 and sensed.

FIG. 14 is an explanatory view showing how the path of the incoming light is shifted.

Image signals of the image sensed by the color image sensor 6 are processed with sample-and-hold operation and amplified by the S/H and AGC circuit 9, then analog-digital conversion performed by the A/D converter 10.

Thereafter, the digital image data is stored in the first memory 11. The stored image data is then applied with color processes by the color processing circuit 13, and the resulting R, G and B image data is stored in the second memory 14.

Upon sensing an image by the aforesaid image sensing apparatus, the image formation position of the optical image on the color image sensor 6 is shifted by a predetermined amount (pixel shifting) by tilting the rotatable plane parallel plate 4 by a predetermined angle, a plurality of images are sensed at different image formation positions, then the sensed images are combined, thereby generating an image of high resolution. In a conventional pixel shifting method, the image formation positions of an image are shifted as shown in FIGS. 15A to 18D, for example.

Here, the pixel shifting method shown in FIGS. 15A to 18D is explained. Four complementary color component data is necessary for each pixel in order to obtain an R, G and B image data. To obtain the four complementary color component data, first, an image formed on the color image sensor 6 at the position shown in FIG. 15A is sensed, then the image is shifted from the image formation position shown in FIG. 15A to the left by one pixel to the position shown in FIG. 15B, where another image is sensed.

Next, the image is shifted upward from the position shown in FIG. 15B by one pixel to the position shown in FIG. 15C, and another image is sensed there, then shifted to the right by one pixel to the position shown in FIG. 15D. At this position, another image is sensed. Accordingly, an image is shifted three times and images are sensed at each image formation position.

Consequently, four complementary color component data of magenta (Mg), green (Gr), cyan (Cy) and yellow (Ye) are obtained for each pixel. In order to obtain an image of better resolution, the image is shifted to the left by half pixel, and with respect to this image formation position (reference position), the aforesaid pixel shifting by one pixel is performed (refer to FIGS. 16A to 16D). This operation is repeated two more times as shifting the reference position upward then to the right by half pixel (FIGS. 17A to 18D). Thus, complementary color images are sensed at positions shifted by a half pixel from each other by performing the aforesaid pixel shifting operation.

However, in the aforesaid conventional pixel shifting method, the pixel shifting by one pixel for obtaining four complementary color component data for each pixel is performed even in a case of sensing a black-and-white image. Accordingly, in the conventional image sensing apparatus, even though a black-and-white image is to be sensed, the numbers of times for shifting an image formation position and for sensing images are the same as those for sensing a color image. As a result, it takes an unnecessarily long time to obtain image data for generating a black-and-white image of high resolution.

SUMMARY OF THE INVENTION

The present invention has been made in consideration of the above situation, and has as its object to reduce the numbers of position shiftings for image formation on a color image sensor and for sensing images, performed in order to generate an image of high resolution, when sensing a black-and-white image.

According to the present invention, the foregoing object is attained by providing an image sensing apparatus having a single CCD type color image sensor and shifting means for shifting an image formation position on the single CCD type color image sensor, where the single CCD type color image sensor senses an image of an object formed at each image formation position shifted by the shifting means, the apparatus comprising: determination means for determining whether the object is a color object for which color image sensing operation is suitable or the object is a black-and-white object for which black-and-white image sensing operation is suitable; shifting control means for controlling the shifting means to perform different pixel shifting methods in a case where the object is a color object and in a case where the object is a black-and-white object in accordance with a determination result by the determination means; and luminance component extraction means for extracting luminance signals from color component data of each color of a filter provided on the single CCD type color image sensor when the object is determined to be a black-and-white object by the determination means.

With the above configuration, an image sensed by a single CCD type color image sensor is determined as a color image or a black-and-white image, and when it is determined to be a black-and-white image, only pixel shifting operation by a half pixel for increasing the resolution of an image is performed, and the pixel shifting operation by a pixel for obtaining each color component data for each pixel is not performed. In addition, when the sensed image is a black-and-white image, a luminance component is extracted from each color component data of the complementary colors by a filter provided on the color image sensor, and a black-and-white image is generated by using the extracted luminance signals.

According to the present invention, the foregoing object is also attained by providing an image sensing apparatus having a single CCD type color image sensor and shifting means for shifting an image formation position on the single CCD type color image sensor where the single CCD type color image sensor senses an image of an object formed at each image format ion position shifted by the shifting means, the apparatus comprising: color/black-and-white designation means for designating whether an image to be sensed is a color image or a black-and-white image; shifting control means for controlling the shifting means to perform different pixel shifting methods in a case where a color image is designated by the color/black-and-white designation means and in a case where a black-and-white image is designated by the color/black-and-white designation means; and luminance component extraction means for extracting luminance signals from color component data of each color of a filter provided on the single CCD type color image sensor when a black-and-white image is designated by the determination means.

With the above configuration, an image sensing operation is selected based on whether a color image is to be sensed by the single CCD type color image sensor or a black-and-white image is to be sensed. To sense a black-and-white image, only the pixel shifting operation by half pixel for increasing the resolution of an image is performed, and the pixel shifting operation by a pixel for obtaining each color component data for each pixel is not performed. In addition, when sensing a black-and-white image, a luminance component is extracted from each color component data of the complementary colors by a filter provided on the color image sensor, and a black-and-white image is generated by using the extracted luminance signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram explaining functions of units of an image sensing apparatus according to a first embodiment of the present invention;

FIGS. 7A to 7E are explanatory views showing image formation positions while pixel shifting operation by half pixel is performed;

FIGS. 15A to 15D are explanatory views showing image formation positions on the single CCD type color image sensor in a pixel shifting operation by a pixel;

FIGS. 16A to 16D are explanatory views showing image formation positions on the single CCD type color image sensor in the pixel shifting operation by a pixel;

FIGS. 17A to 17D are explanatory views showing image formation positions on the single CCD type color image sensor in the pixel shifting operation by a pixel;

FIGS. 18A to 18D are explanatory views showing image formation positions on the single CCD type color image sensor in the pixel shifting operation by a pixel;

FIGS. 19A to 19E are conceptual views showing storage area in a memory when four images of a black-and-white images are sensed and synthesized into a single image;

FIG. 20 is a block diagram illustrating a configuration of a conventional image sensing apparatus.

DETAILED DESCRIPTION OF THE PREFERRED EMBODIMENTS

Figure 2A:
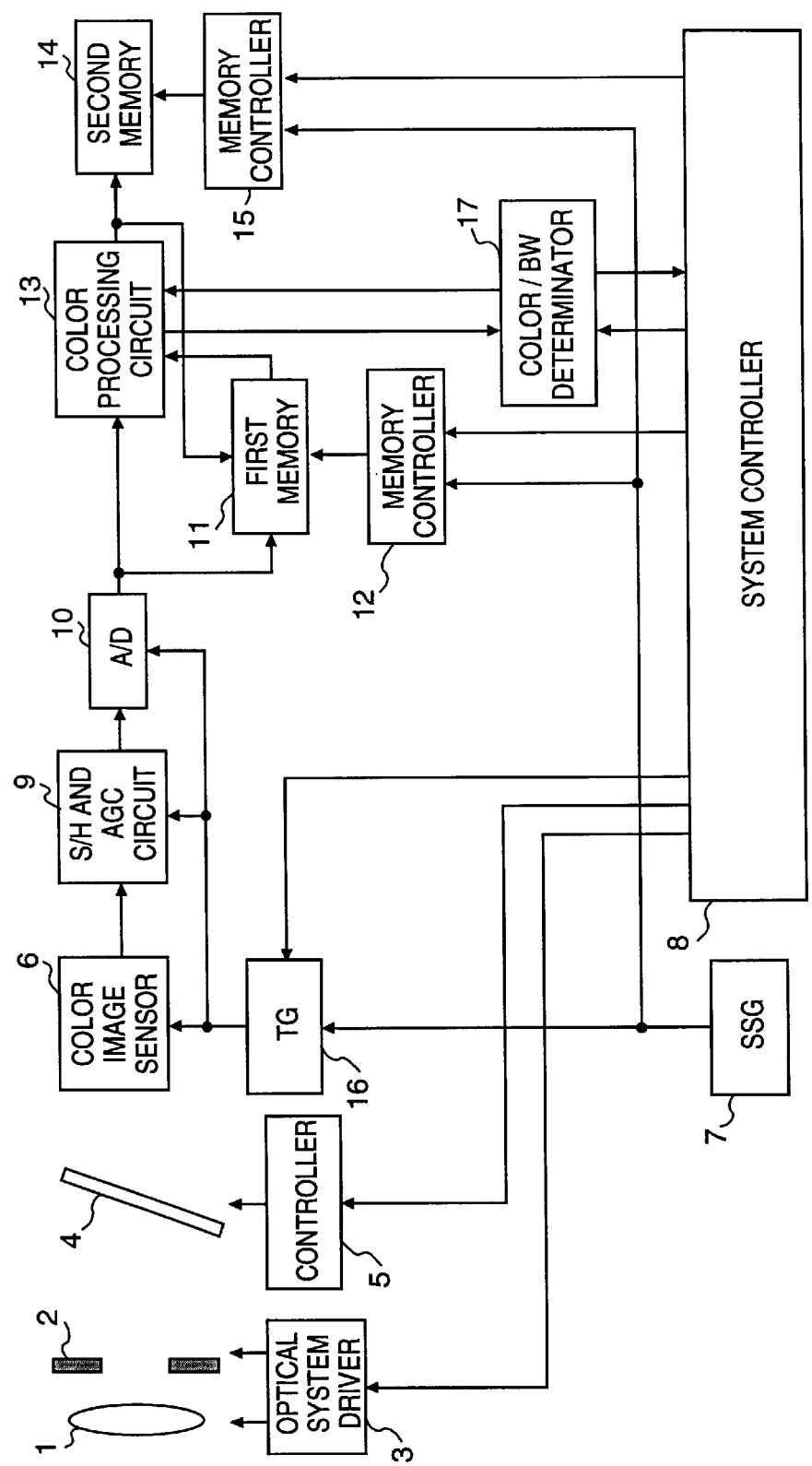
FIG. 2A is a block diagram illustrating a configuration of an image sensing apparatus according to the first embodiment.

Preferred embodiments of the present invention will be described in detail in accordance with the accompanying drawings.

<First Embodiment>

In the first embodiment, for determining whether an object to be sensed is a color object for which color image sensing operation is suitable or a black-and-white object for which black-and-white image sensing operation is suitable, an image of the object is sensed, then color difference signals U and V are generated and used for the determination.

In this case, when sensing a black-and-white object, the color difference signals U and V of the sensed image of the object are zero. Therefore, by comparing the color difference signals U and V to a predetermined threshold value, it is possible to determine that the sensed image is a black-and-white image, for example, if the color difference signals U and V are equal or less than the threshold value.

The above comparison may be performed on a predetermined area of a sensed image when sensing a color object, such as a landscape, if color components are distributed over the image. However, in case where color components are not distributed over the image (such as an image of a flower in a white background), the color difference signals U and V all over the sensed image is accumulated and averaged, thereafter the sensed image is determined to be a color image when the average is greater than a threshold or to be a black-and-white image if the average is equal to or less than the threshold.

FIG. 1 is a block diagram for explaining functions of units of an image sensing apparatus according to the first embodiment.

In FIG. 1, reference numeral 101 denotes an optical lens; 102, a light path shifting unit; 103, a light path shifting controller; 104, a single CCD type color image sensor (referred as "color image sensor"); 105, an analog-digital (A/D) converter; 106, a first storage unit; 107, a signal processor; 108, a second storage unit; 200, a color image/black-and-white image (Color/BW) determination unit; 109, a luminance component detector; 110; a black-and-white image generation unit; and 111, a color image generation unit.

The optical lens 101 is for guiding the light reflected by an object (an optical image) into the image sensing apparatus.

The light path shifting unit 102 is for shifting the light path of the optical image incoming through the optical lens 101.

The light path shifting controller 103 is for controlling operation of the light path shifting unit 102.

The color image sensor 104 is for sensing the optical image incoming through the optical lens 101 and generating image signals.

The A/D converter 105 is for performing analog-digital conversion of the image signals generated by the color image sensor 104.

The first storage unit 106 is for storing digital image data converted by the A/D converter 105.

The signal processor 107 is for performing predetermined signal processes on the digital image data stored in the first storage unit 106 to convert the data from complementary color image data into RGB color image data when the sensed image is determined to be a color image.

The second storage unit 108 is for storing the image data applied with the predetermined signal processes by the signal processor 107.

The Color/BW determination unit 200 is for determining whether the image sensed by the color image sensor 104 is a color image or a black-and-white image.

The luminance component detector 109 is for obtaining a luminance component from each complementary color component data when the sensed image is determined to be a black-and-white image.

The color image generation unit 111 is for generating a color image on the basis of image data obtained while shifting the image formation position of the optical image on the color image sensor 104 by one pixel and by less than one pixel (this pixel shifting operation will be described later in detail), when the image sensed by the single CCD type image sensor 104 is determined to be a color image.

The black-and-white image generation unit 110 is for generating a black-and-white image on the basis of image data obtained while shifting the image formation position of the optical image on the color image sensor 104 by less than one pixel (this operation will be also described later in detail), and separating luminance components out of the color component data of the complementary colors of the filter by the luminance component detector 109.

In the image sensing apparatus having the aforesaid configuration according to the first embodiment, whether the image sensed by the color image sensor 104 is a color image or a black-and-white image is determined by the Color/BW determination unit 200. Then, as a determination result by the Color/BW determination unit 200, if the image sensed by the color image sensor 104 is determined to be a black-and-white image, image data is obtained while shifting the image formation position on the color image sensor 104 by less than one pixel. An example of this pixel shifting operation will be explained later, in detail.

Thereafter, in the luminance component detector 109, luminance components are obtained from the color component data of the complementary colors using the filter of the color image sensor 104.

Next, an image sensing apparatus of the present invention will be further explained with reference to a figure illustrating an example of a configuration of the image sensing apparatus. FIG. 2A is a block diagram illustrating a configuration of the image sensing apparatus according to the first embodiment. In FIG. 2A, reference numeral 1 denotes an optical lens; 2, an iris diaphragm; 3, an optical system driver; 4, a rotatable plane parallel plate for shifting the light path; 5, a controller for controlling the plane parallel plate; and 6, a single CCD type color image sensor (simply referred as "color image sensor", hereinafter) which is provided with a complementary color mosaic filter (magenta, green, cyan and yellow).

Further, reference numeral 7 denotes a synchronizing signal generator (SSG); 8, a system controller for controlling the entire system and outputting various control signals; 9, a sample-and-hold (S/H) and automatic gain control (AGC) circuit; 10, an analog-digital (A/D) converter; 11, a first memory for storing complementary color image data; 12, a memory controller for controlling the first memory 11; 13, a color processing circuit for converting the complementary color image data to RGB color image data; and 14, a second memory for storing the RGB color image data obtained by performing the color processing on the complementary color image data by the color processing circuit 13.

Further reference numeral 15 denotes a memory controller for controlling the second memory 14 so that images are stored in memory areas of the second memory 14 corresponding to image formation positions on the color image sensor 6 shifted by the plane parallel plate 4; and 16, a timing signal generator (TG).

Further, reference numeral 17 denotes a color image/black-and-white image (Color/BW) determinator for determining whether the sensed image is a black-and-white image or a color image.

In the image sensing apparatus configured as above according to the first embodiment, incoming light incidents on the color image sensor 6. Between the light coming from the outside of the image sensing apparatus and the light is incident on the color image sensor 6, the path of the light is shifted by the light path shifting unit 102 shown in FIG. 1, i.e., the plane parallel plate 4 in FIG. 2A, rotatably installed between the iris diaphragm 2 and the color image sensor 6, by rotating it about two axes which are perpendicular to each other.

Figure 14:
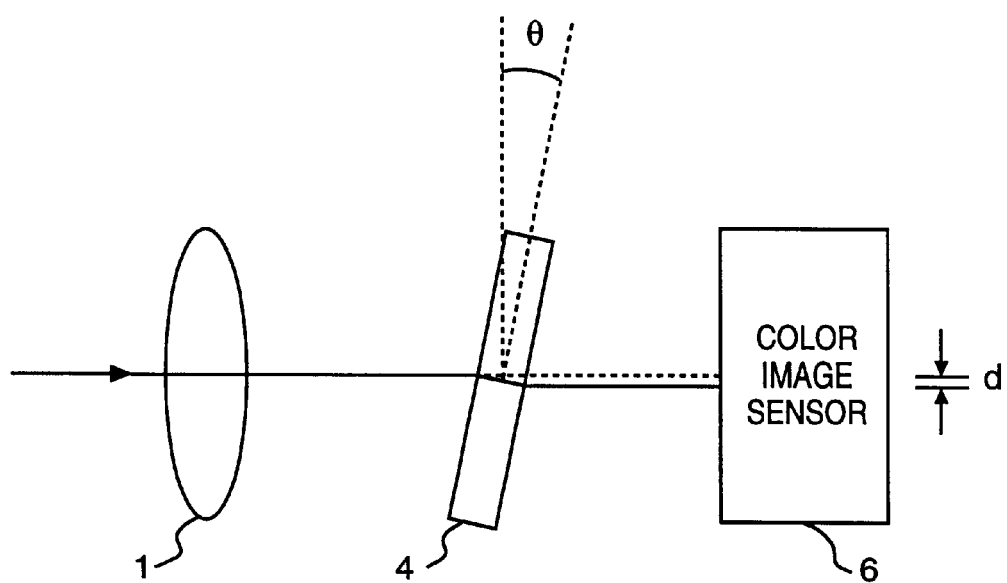
FIG. 14 is an explanatory view showing how an image is shifted on a single CCD type color image sensor by using a plane parallel plate.

The optical path is shifted as explained with reference to FIG. 14 above. Further, the color image sensor 6 is operated in accordance with a timing signal generated by the TG 16 on the basis of a synchronous signal generated by the SSG 7.

Image signals of the image sensed by the color image sensor 6 is applied with correlated double sampling and an automatic gain control process by the S/H and AGC circuit 9. Thereafter, the processed image signals are digitized by the A/D converter 10, thereby digital image data is generated.

The digital image data generated as above is of a complementary color image, and stored in the first memory 11. Thereafter, the image data read out from the first memory 11 is applied with color processes by the color processing circuit 13, converted from the image data of the complementary color image into RGB color image data, then stored in the second memory 14.

The Color/BW determinator 17 receives Y, U and V signals from the color processing circuit 13 and determines whether the sensed image is a black-and-white image or a color image, depending upon whether the average of the U and V signals is over a predetermined threshold or not.

FIGS. 3 to 6 are flowcharts for explaining processing sequence of the image sensing apparatus according to the first embodiment.

Figure 2B:
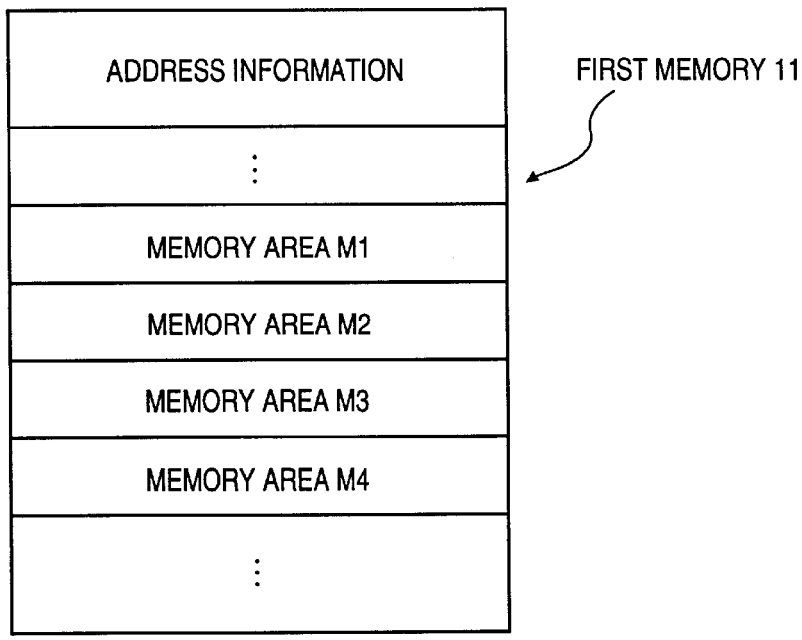
FIG. 2B is a conceptual view of a first memory 11 shown in FIG. 2A.

First, a process for discriminating between a color image or a black-and-white image will be explained with reference to FIG. 3. An image is sensed by the color image sensor 6 at an initial sensing position, and stored in a memory area of the first memory 11 shown in FIG. 2B (memory area M1) (step S201). Note, as shown in FIG. 2B, the first memory 11 includes four memory areas, M1 to M4, in the first embodiment. The image sensed at step S201 is of the complementary colors. The sensed complementary color image is applied with predetermined processes at the color processing circuit 13, thereby converted into an image represented by Y, U and V signals (step S202).

The Color/BW determinator 17 picks up color difference signals U and V out of the Y, U and V signals converted by the color processing circuit 13, accumulates the color difference signals U and V, and obtains the average by dividing the sum (step S203) by the number of pixels. Next at step S204, whether or not the average of the color difference signals U and V calculated at step S203 is greater than a predetermined threshold is determined.

As a determination result at step S204, if the average of the color difference signals U and V is equal or less than the predetermined threshold, then it is determined that the sensed image is a black-and-white image. In response to the determination result, the process proceeds to step S205 where an operation for sensing a black-and-white image is performed. On the contrary, when the average is greater than the predetermined threshold, the process proceeds to step S206 where an operation for sensing a color image is performed.

Figure 4:
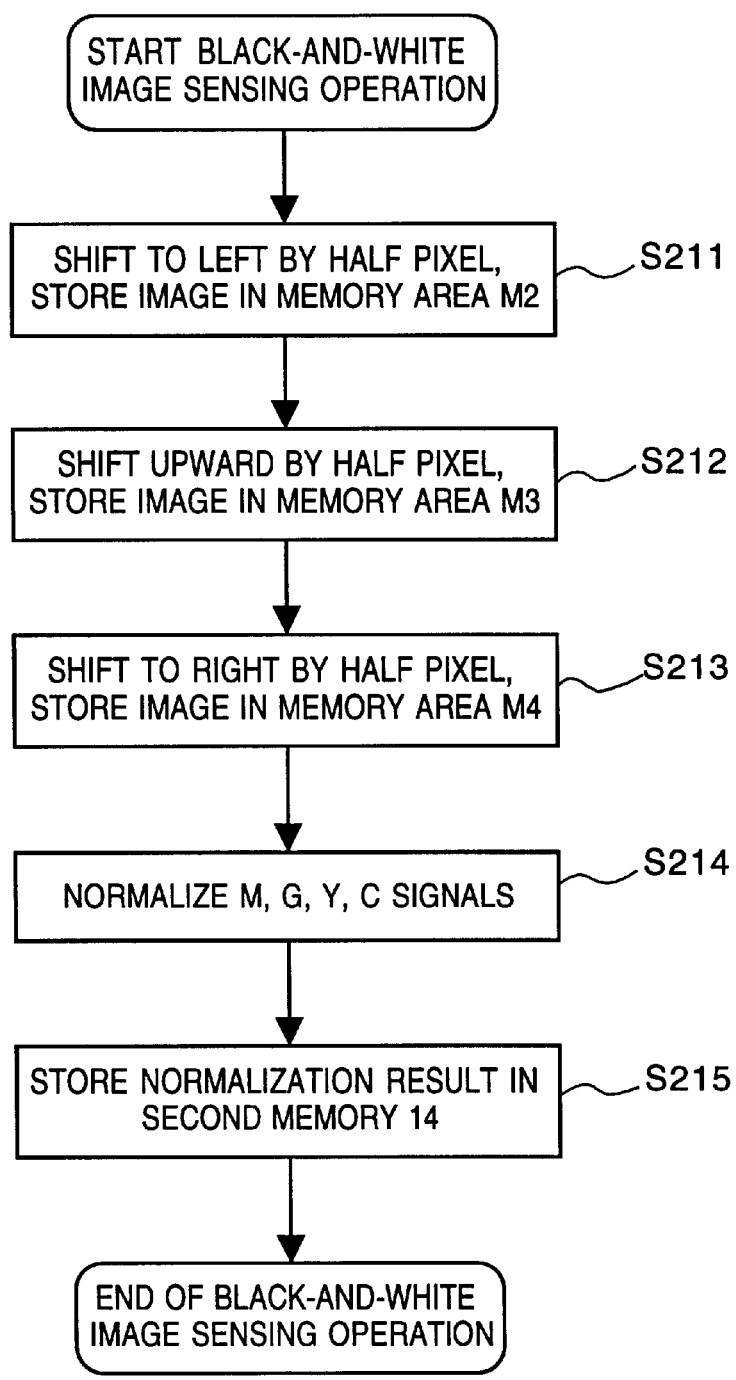
FIG. 4 is a flowchart showing processing sequence of sensing a black-and-white image.

When the Color/BW determinator 17 determines that the sensed image is a black-and-white image at step S204, three more images are sensed while shifting image formation position of the image on the color image sensor 6 by half pixel as in the processing sequence shown in the flowchart in FIG. 4.

More specifically, at the first step S211 in FIG. 4, the image formation position on the color image sensor 6 is shifted by a half pixel to the left from the position where the image stored in the memory area M1 is sensed (refer to FIG. 7B), and another image is sensed and stored in a memory area of the first memory 11 (memory area M2).

Next at step S212, the image formation position on the color image sensor 6 is shifted upward by a half pixel from the position where the image stored in the memory area M2 is sensed (refer to FIG. 7C), then another image is sensed and stored in a memory area of the first memory 11 (memory area M3).

At step S213, the image formation position on the color image sensor 6 is further shifted by a half pixel to the right from the position where the image stored in the memory area M3 is sensed (refer to FIG. 7D), then another image is sensed and stored in a memory area of the first memory 11 (memory area M4). With these four images, color component data of pixels shown in FIG. 7E can be obtained.

Figure 8:
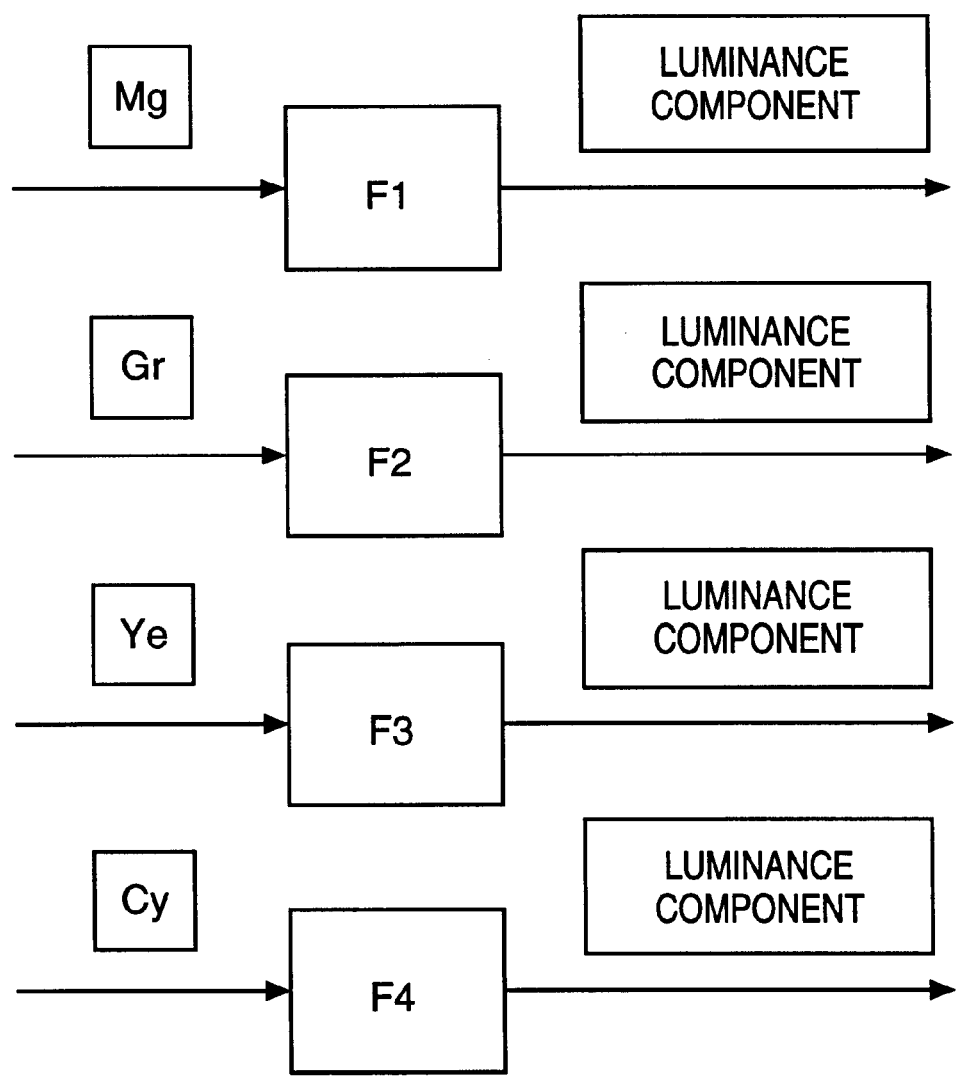
FIG. 8 is an view for obtaining luminance component from each complementary color component data.

Each image sensed as above is composed of pixels represented by complementary color components arranged in a fixed pattern. A normalization function which is obtained in advance by taking consideration of characteristics of color filter components of the color image sensor 6 is applied to each color component data, thereby luminance component is extracted (step S214). FIG. 8 is a conceptual view showing the above process, and F1 to F4 denote color filter of magenta (Mg), green (Gr), yellow (Ye) and cyan (Cy), respectively.

Next, the luminance components extracted from the four images are stored in a memory area of the second memory as a black-and-white image (step S215).

Figures 19A, 19B, 19C, 19D, 19E:
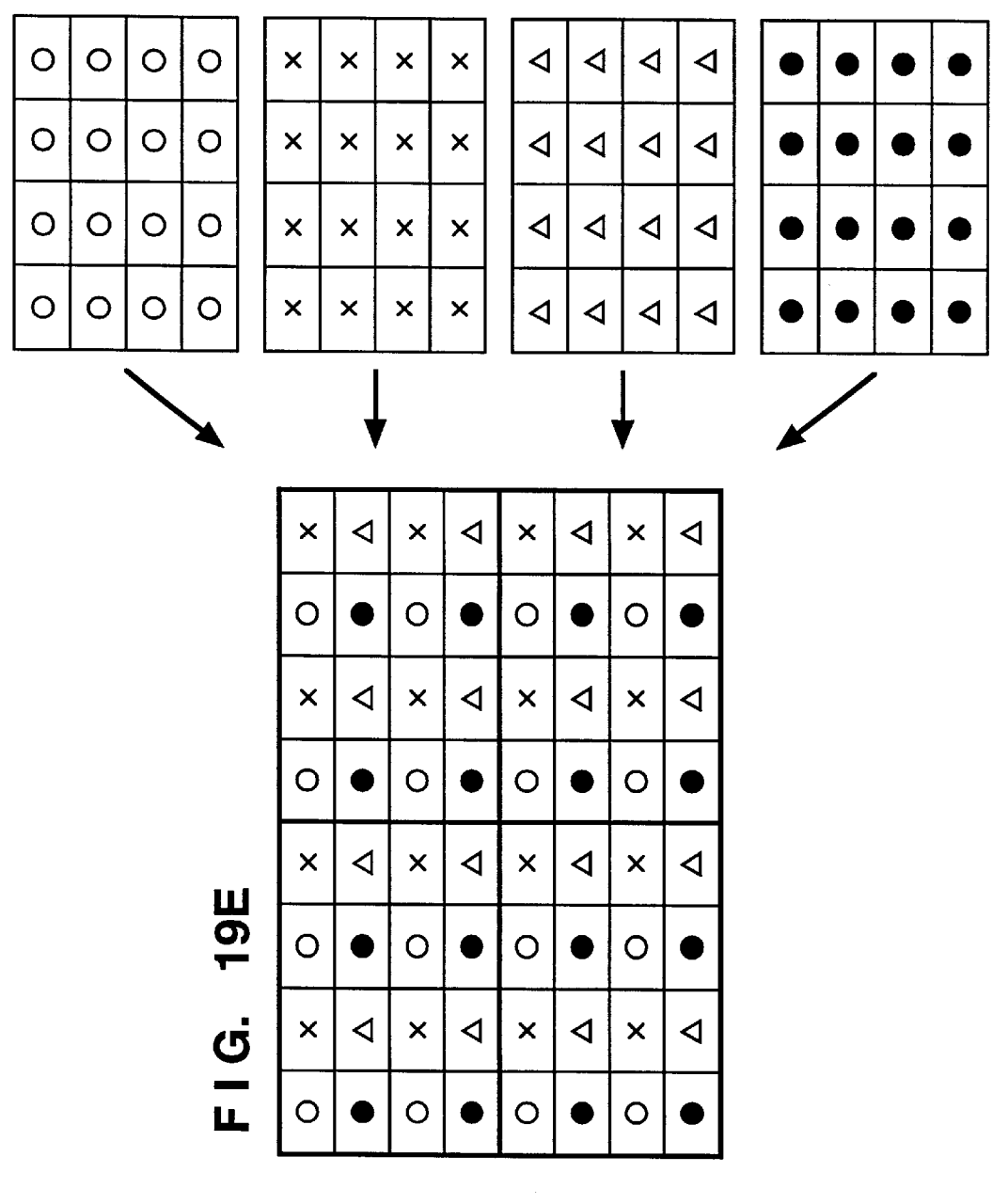

FIGS. 19A to 19E are explanatory views for explaining conceptual storage area in the second memory 14. FIG. 19A shows an image sensed at an initial image formation position, FIG. 19B shows an image sensed at a position shifted by a half pixel to the left from the initial image formation position, FIG. 19C shows an image sensed at a position further shifted upward by a half pixel, and FIG. 19D shows an image sensed at a position further shifted by a half pixel to the right. These images are stored in the second memory 14 as shown in FIG. 19E.

Figure 3:
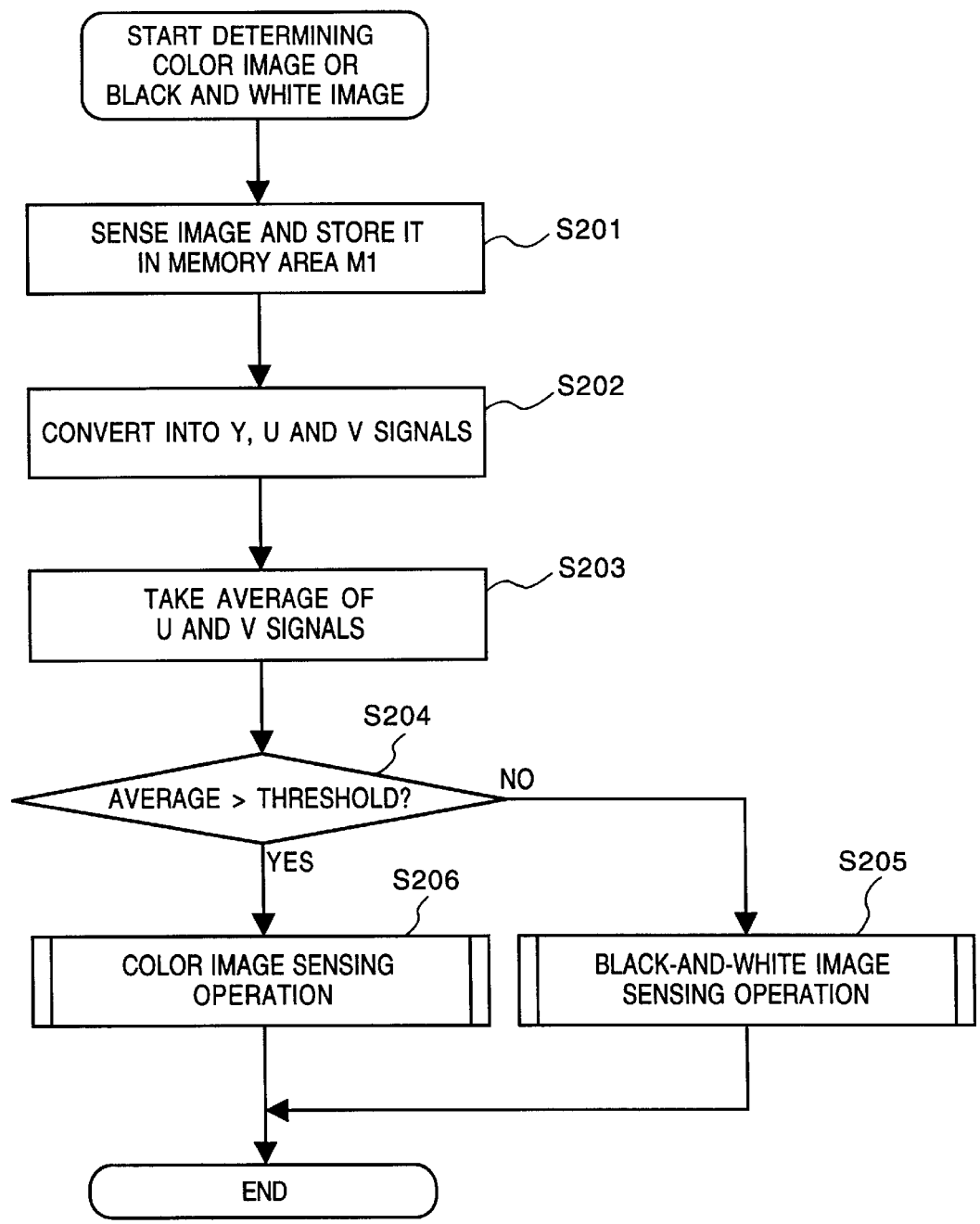
FIG. 3 is a flowchart showing processing sequence of discriminating a black-and-white image from a color image.

In contrast, in a case where the sensed image is determined to be a color image at step S204 in FIG. 3, the process proceeds to step S206, where fifteen more images of the object are sensed while shifting the image formation position of the image on the color image sensor 6 by a pixel and by a half pixel.

Figure 5:
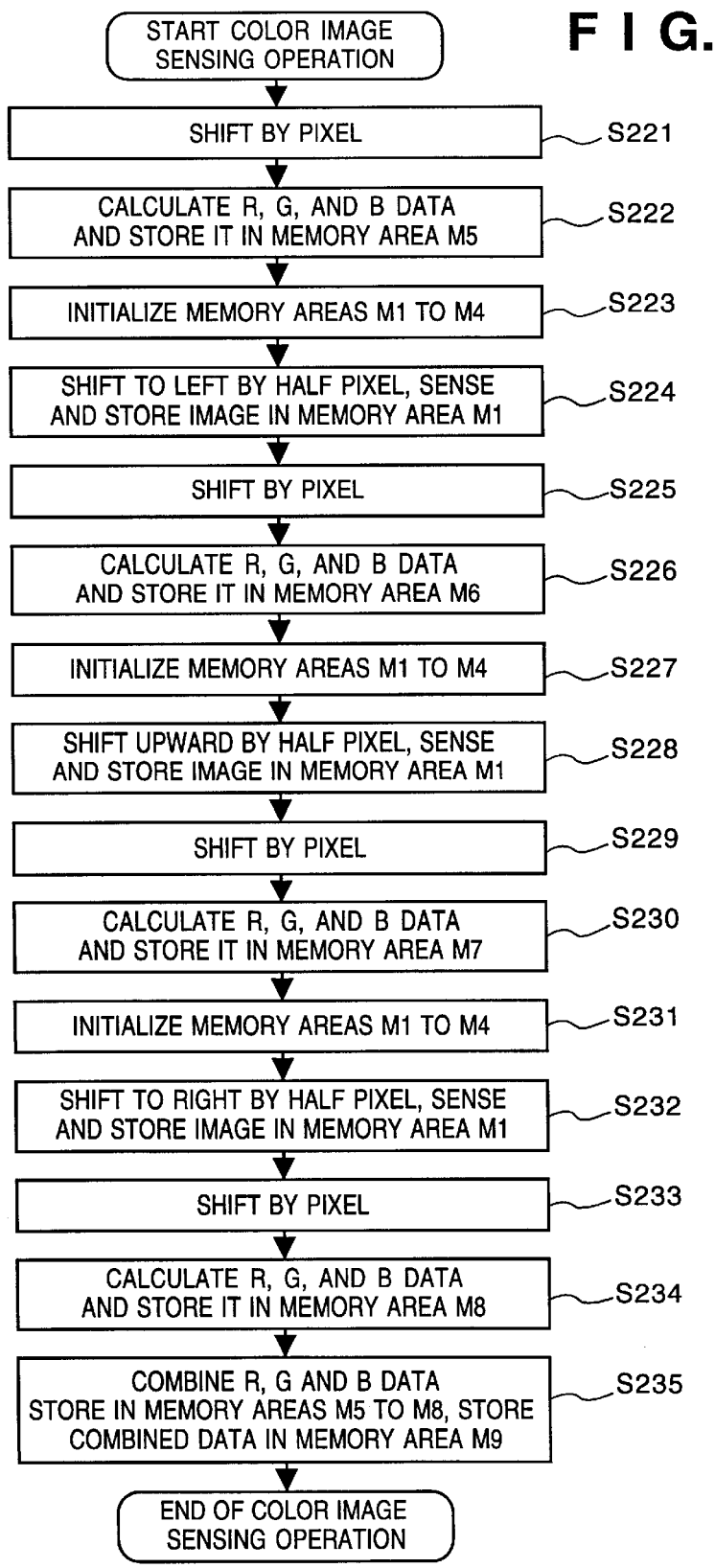
FIG. 5 is a flowchart showing processing sequence of sensing a color image.

More specifically, when the image sensing operation of color images is started, at step S221 in FIG. 5, three more images are sensed while shifting the image formation position by a pixel from the initial sensing position where the first image is sensed at step S201 in FIG. 3.

Here, an operation of sensing color images while shifting the image formation position on the color image sensor 6 by a pixel will be explained with reference to FIGS. 6 and 15A to 15D.

Figure 6:
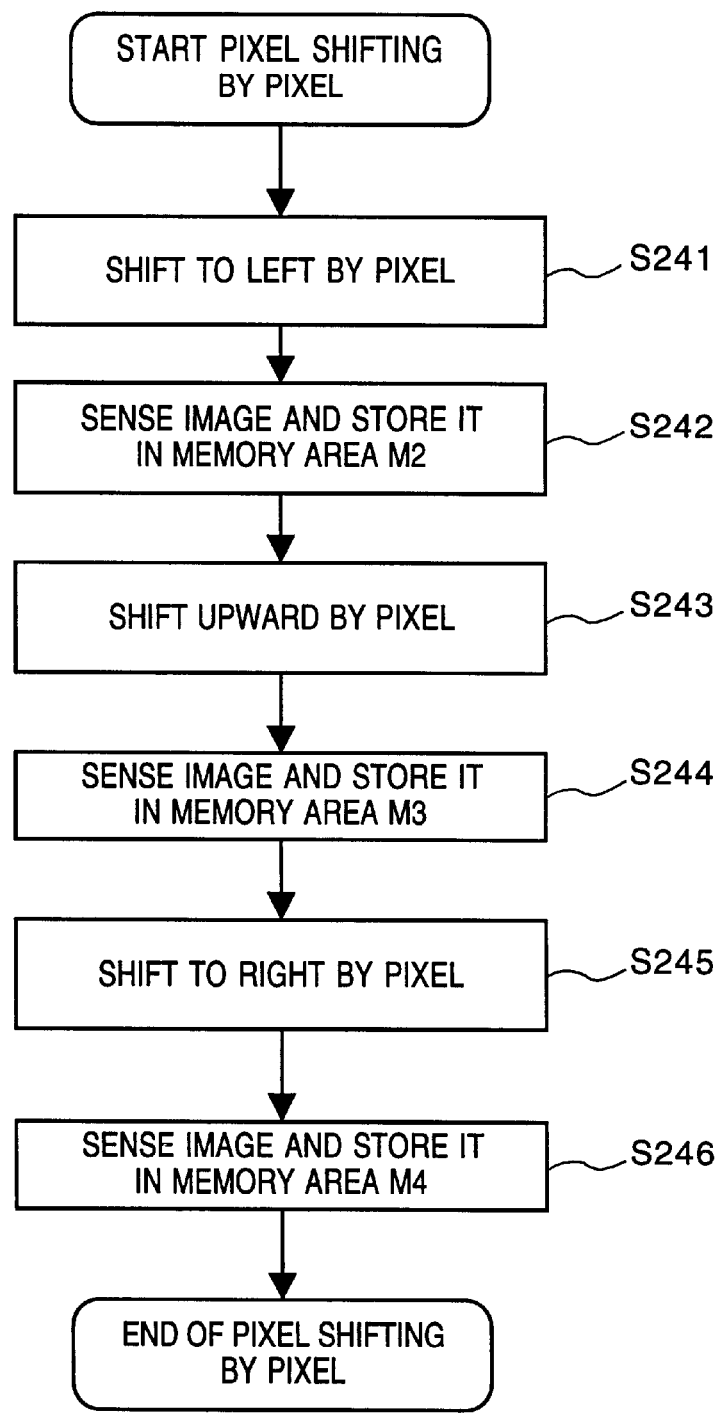
FIG. 6 is a flowchart for explaining pixel shifting operation by a pixel.

Upon sensing color images, pixel shifting operation is performed as shown in FIG. 6. First at step S241, the image formation position of an image of an object on the color image sensor 6 is shifted by a pixel to the left (refer to FIG. 15B) from the position where the image stored in the memory area M1 is sensed (refer to FIG. 15A). Then, the process proceeds to step S242, where an image is sensed at the shifted position and stored in the memory area M2.

Next at step S243, the image formation position is shifted upward by a pixel (refer to FIG. 15C), and an image is sensed and stored in the memory area M3 at step S244.

Then at step S245, the image formation position is shifted by a pixel to the right (refer to FIG. 15D), and an image is sensed and stored in the memory area M4 at step S246.

When the pixel shifting operation by a pixel as described above is completed at step S221 in FIG. 5, the process proceeds to step S222.

At step S222, R, G and B data are calculated by a pixel on the basis of the images stored in the memory areas M1 to M4, and stored in a memory area of the second memory 14 (memory area M5). Note, the second memory 14 includes five memory areas, M5 to M9, in the first embodiment.

Thereafter, the process proceeds to step S223, where the memory areas M1 to M4 are initialized.

Then, at step S224, the image formation position is shifted by a half pixel to the left from the position where the image previously stored in the memory area M1 is sensed, and an image is sensed and stored in the memory area M1.

The process proceeds to step S225 where three more images are sensed while shifting by a pixel from the shifted position as at step S221, then respectively stored in the memory areas M2 to M4.

At step S226, R, G and B data is calculated by a pixel on the basis of the images stored in the memory areas M1 to M4, and stored in a memory area of the second memory 14 (memory area M6).

Thereafter, the process proceeds to step S227, where the memory areas M1 to M4 are initialized.

Next, at step S228, the image formation position is shifted upward by half pixel from the position where the image previously stored in the memory area M1 is sensed, and an image is sensed and stored in the memory area M1.

The process proceeds to step S229 where three more images are sensed while shifting by a pixel from the shifted position as at step S221, then respectively stored in the memory areas M2 to M4.

At step S230, R, G and B data is calculated by a pixel on the basis of the images stored in the memory areas M1 to M4, and stored in a memory area of the second memory 14 (memory area M7).

Thereafter, the process proceeds to step S231, where the memory areas M1 to M4 are initialized.

Next at step S232, the image formation position is shifted by a half pixel to the right from the position where the image previously stored in the memory area M1 is sensed, and an image is sensed and stored in the memory area M1.

The process proceeds to step S233 where three more images are sensed while shifting by a pixel from the shifted position as at step S221, then respectively stored in the memory areas M2 to M4.

At step S234, R, G and B data is calculated by a pixel on the basis of the images stored in the memory areas M1 to M4, and stored in a memory area of the second memory 14 (memory area M8).

The process proceeds to step S235, where R, G and B data stored in the memory areas M5 to M8 are combined, then stored in a memory area of the second memory 14 (memory area M9). After this process, the color image sensing operation is completed.

Next, a method of obtaining a function for normalizing each color component will be explained. This function depends upon the characteristics of the filter of the color image sensor and the light source. However, it is assumed that the same light source is used for sensing an image in the first embodiment, and that the characteristics of the filter do not change since the same color image sensor is used throughout an image sensing operation. Under these conditions, an image of a white paper is sensed, then signal values of the complementary colors, M0, G0, C0 and Y0, are obtained in advance.

The ratios of complementary color signal values of a sensed image to the complementary color signal values M0, G0, C0 and Y0 show characteristics of the light source and the filter of the color image sensor. Accordingly, in a practical image sensing operation, obtained signal values, Mgv, Grv, Cyv and Yev, of Mg, Gr, Cy and Ye are respectively divided by the signal values, Mgv0, Grv0, Cyv0 and Yev0, then further multiplied by a constant k which is common to each color signal component for adjusting intensity. Thus, luminance signals of the image are obtained.

More specifically, the luminance signals are obtained in accordance with the following equations, Luminance signal of $Mg = k \times Mgv/Mgv0$ Luminance signal of $Gr = k \times Grv/Grv0$ Luminance signal of $Cy = k \times Cyv/Cyv0$ Luminance signal of $Ye = k \times Yev/Yev0$.

In the first embodiment, color difference signals U and V are used for discriminating a color image from a black-and-white image, however, the present invention is not limited to this, and any determination method can be applied.

According to the first embodiment as described above, an image sensed by a single CCD type color image sensor is determined whether it is a color image or a black-and-white image. Then, when it is determined that the sensed image is a black-and-white image, only the pixel shifting operation by a half pixel for increasing the resolution of an image is performed, and the pixel shifting operation by a pixel for obtaining each color component data for each pixel is not performed. In addition, when the sensed image is a black-and-white image, a luminance component is extracted from each color component data of the complementary colors by a filter provided on the color image sensor, and a black-and-white image of high resolution is generated by using the extracted luminance signals. As a result, it is possible to reduce the number of shifts of the image formation position and the number of times to sense images for obtaining a black and white image of high resolution, thereby obtaining a black-and-white image of high resolution in a shorter time period.

<Second Embodiment>

Figure 9:
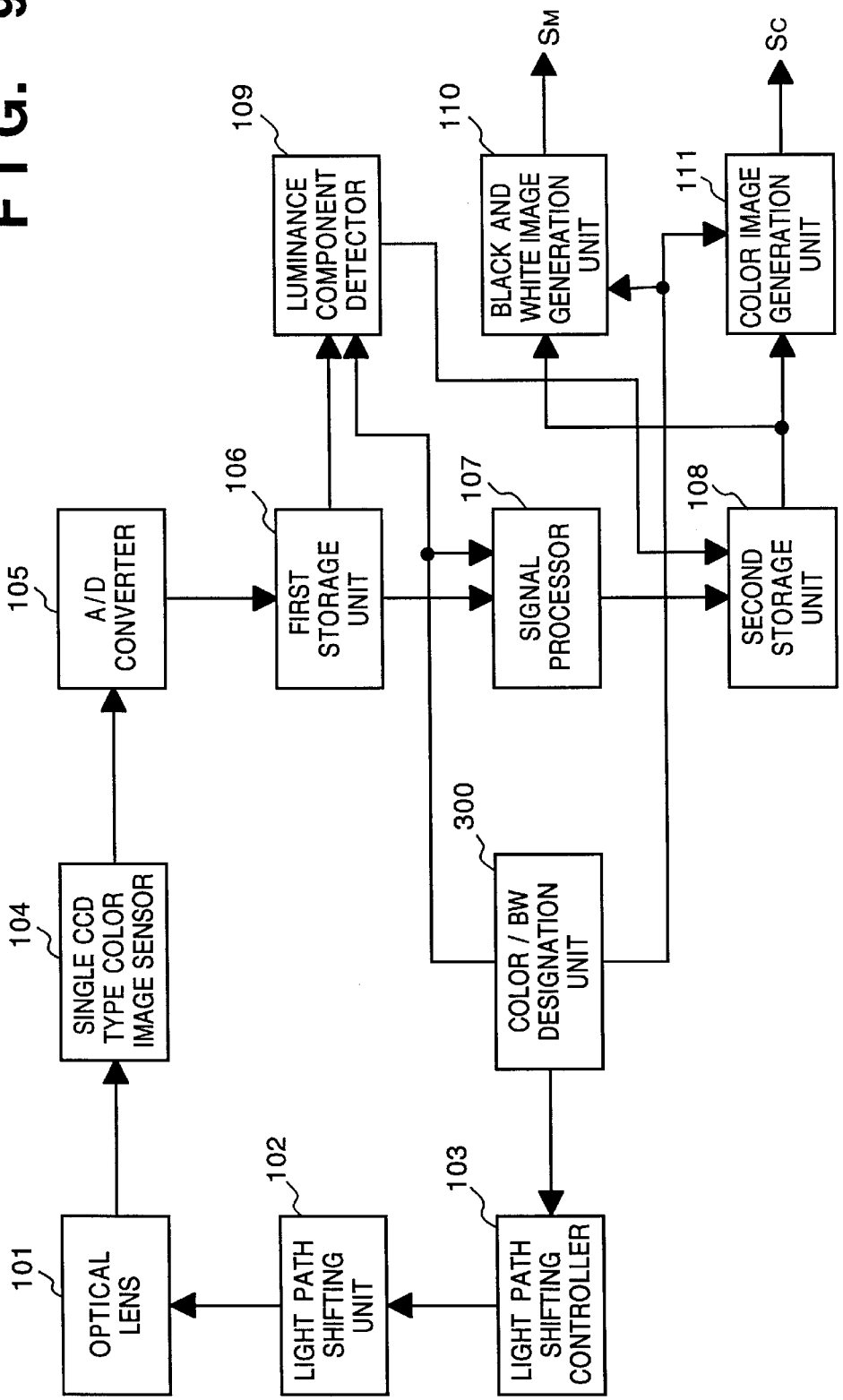
FIG. 9 is a block diagram explaining functions of units of an image sensing apparatus according to a second embodiment of the present invention.

FIG. 9 is a block diagram for explaining functions of an image sensing apparatus according to a second embodiment. In FIG. 9, the same units as those in FIG. 1 explained in the first embodiment are referred by the same reference numerals, and explanation of those are omitted, and different unit and functions are explained.

In FIG. 9, reference numeral 300 denotes a color image/black-and-white image (Color/BW) designation unit. The Color/BW designation unit 300 is for a user to designate whether a color image is to be sensed or a black-and-white image is to be sensed by the color image sensor 104.

Further, in the second embodiment, the signal processor 107 is for performing predetermined signal processes on the image data stored in the first storage unit 106 to convert from complementary color image data into RGB color image data when it is designated to sense a color image by the Color/BW designation unit 300.

The luminance component detector 109 is for obtaining a luminance component from each complementary color component data of a sensed image when it is designated to sense a black-and-white image by the *Color/BW designation unit 300.

The color image generation unit 111 is for generating a color image on the basis of image data obtained by shifting the image formation position of the incoming optical image on the color image sensor 104 by one pixel and by less than one pixel as described in the first embodiment, when it is designated to sense a color image by the Color/BW designation unit 300.

The black-and-white image generation unit 110 is for generating a black-and-white image on the basis of image data obtained by shifting the image formation position of the incoming optical image on the color image sensor 104 by less than one pixel, as described in the first embodiment, and by separating luminance components from color component data of the complementary colors of the filter by the luminance component detector 109, when it is designated to sense a black-and-white image by the Color/BW designation unit 300.

In the image sensing apparatus of the second embodiment configured as above, whether a color image is to be sensed or a black-and-white image is to be sensed is designated by the Color/BW designation unit 300. Then, when a black-and-white image is designated by the Color/BW designation unit 300, images are sensed while shifting the image formation position of the incoming optical image on the color image sensor 104 by less than one pixel. Shifting method for sensing a black-and-white image is the same as that described in the first embodiment, thus the explanation of the method is omitted.

The luminance component detector 109 extracts luminance components from the color component data of the complementary colors of the filter provided on the color image sensor 104, then a black-and-white image is generated on the basis of the luminance components. Accordingly, for sensing a black-and-white image in high resolution, the number of times to shift the image formation position and the number of times to sense images can be reduced, thereby shortening the time period for sensing a black-and-white image of high resolution.

Figure 2C:
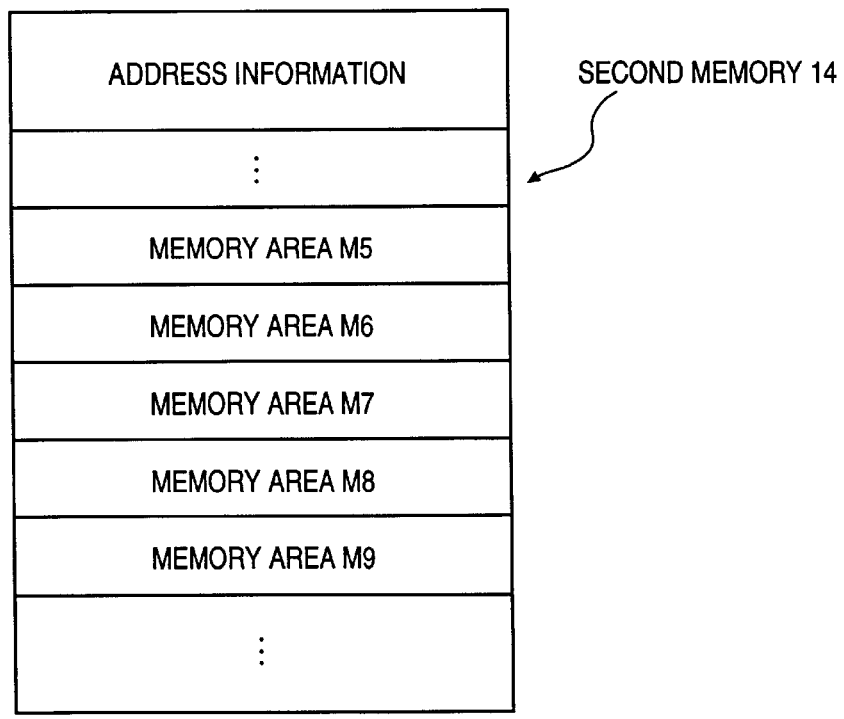
FIG. 2C is a conceptual view of a second memory 14 shown in FIG. 2A.
Figure 10:
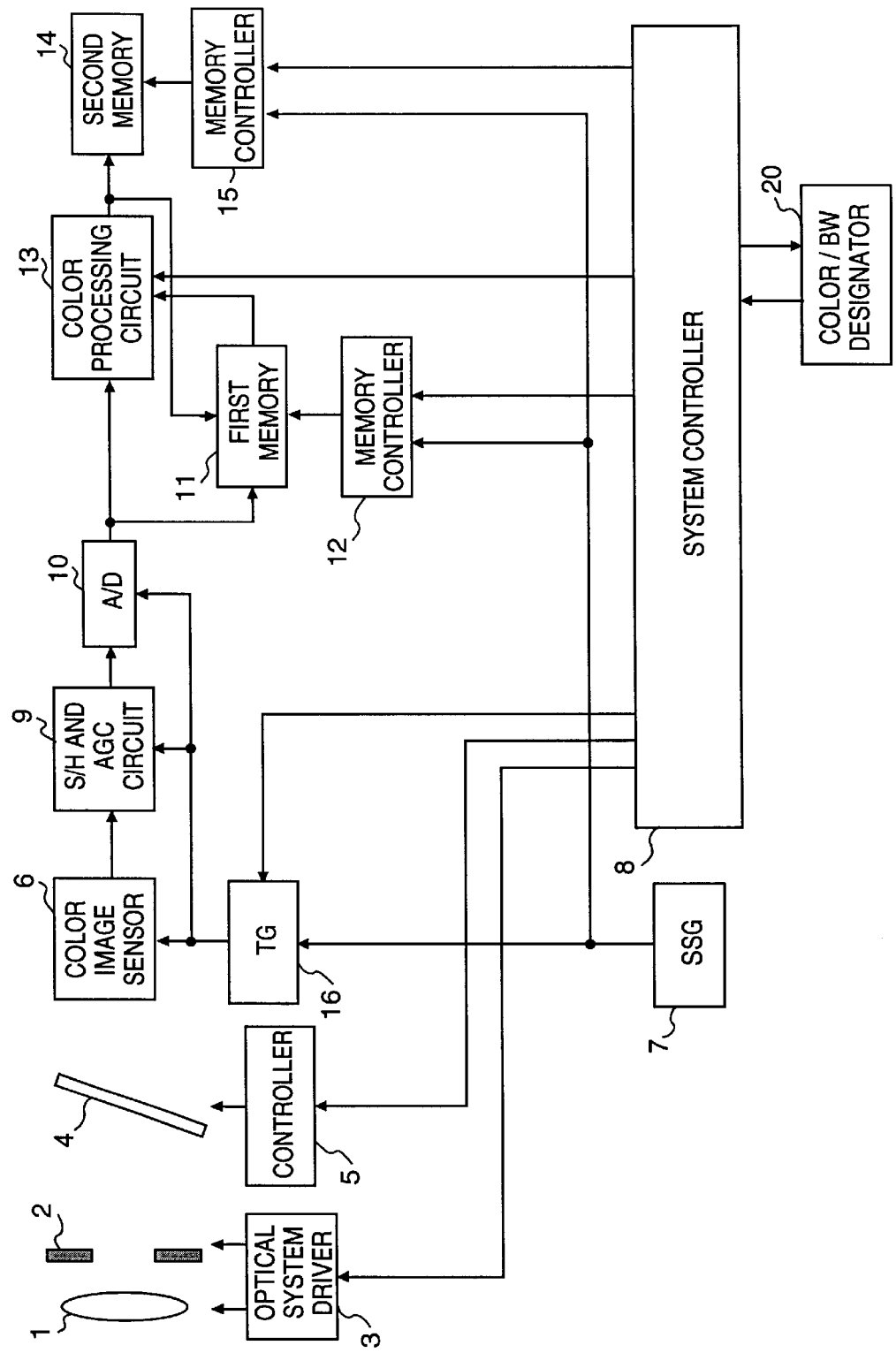
FIG. 10 is a block diagram illustrating a configuration of an image sensing apparatus according to the second embodiment.

Next, an example of the second embodiment will be described with reference to FIG. 10. In FIG. 10, the same units and elements as those in FIG. 2 are referred by the same reference numerals, and explanations of those are omitted, and different part and functions are explained. Note, in the second embodiment, the first memory 11 and the second memory 14 includes memory areas M1 to M4 and M5 to M9, respectively, as shown in FIGS. 2B and 2C.

In FIG. 10, reference numeral 20 denotes a color image/black-and-white image (Color/BW) designator, such as an electrical switch, for a user to designate whether an object to be sensed is a black-and-white object or a color object.

Figure 11:
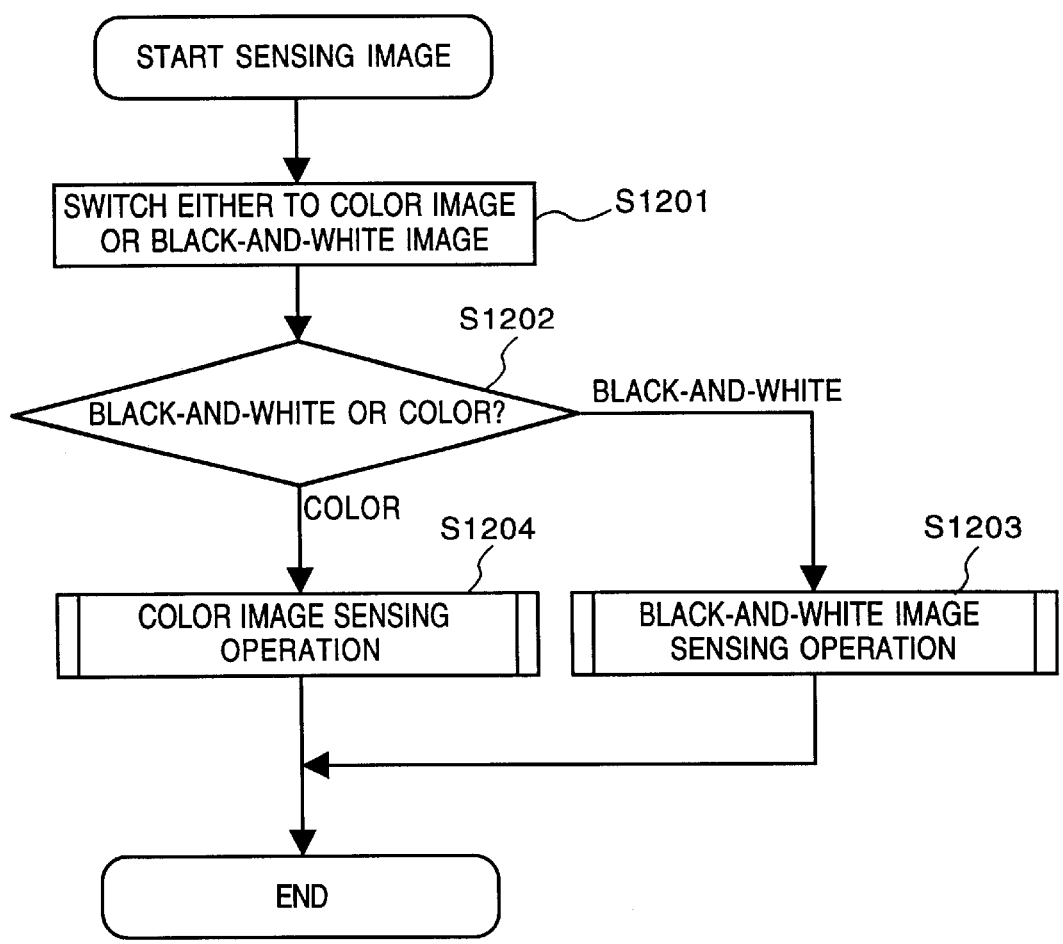
FIG. 11 is a flowchart showing processing sequence of designating either a black-and-white image sensing operation or a color image sensing operation.

FIG. 11 is a flowchart for explaining a processing sequence of the image sensing apparatus of the second embodiment.

First, a user sets the Color/BW designator 20 either to a color image or to a black-and-white image (step S1201). The state of the switch is detected at the next step S1202, then whether a color image sensing operation is to be performed or a black-and-white image sensing operation is to be performed is judged.

As a judged result at step S1202, if the black-and-white image sensing operation is designated, the process proceeds to step S1203, where the black-and-white image sensing operation is performed.

In contrast, as a judged result at step S1202, if the color image sensing operation is designated, the process goes to step S1204, where the color image sensing operation is performed.

Figure 12:
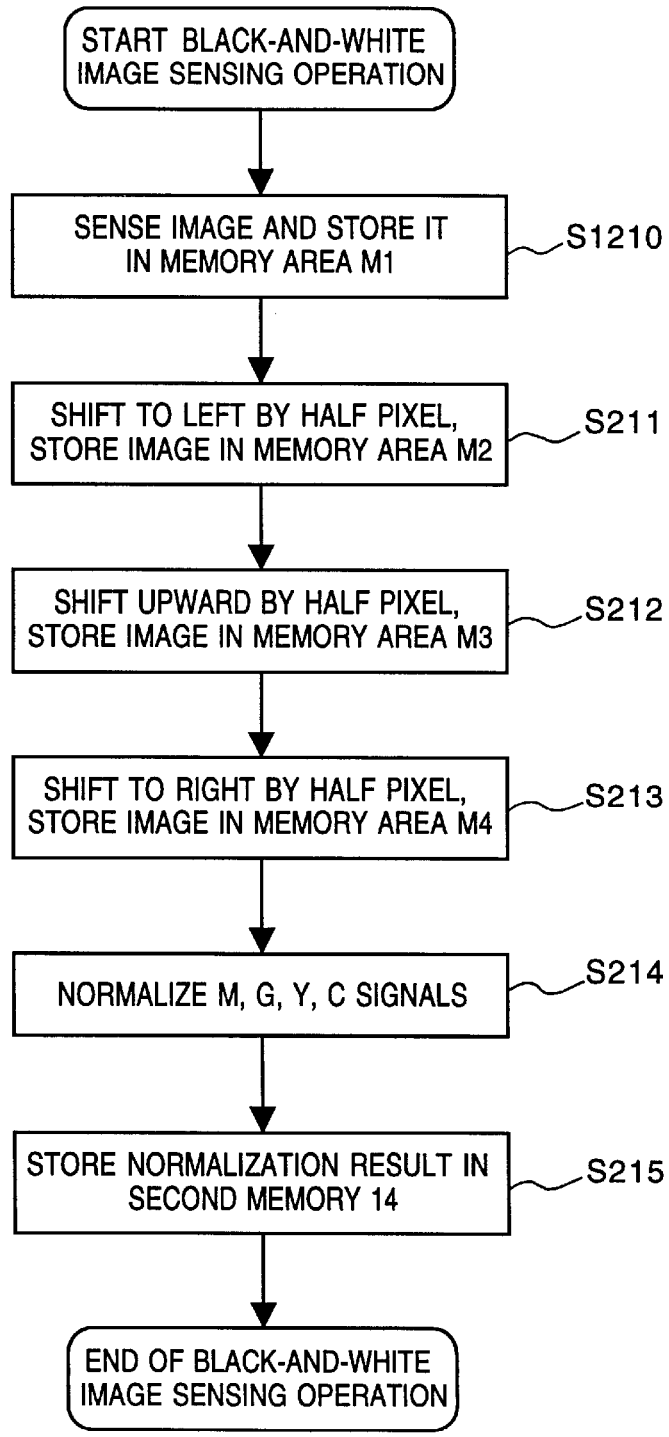
FIG. 12 a flowchart showing processing sequence of sensing a black-and-white image.

The black-and-white image sensing operation is performed in a processing sequence shown in a flowchart in FIG. 12, and four images are sensed while shifting image formation position on the color image sensor 6 by half pixel.

The pixel shifting method is basically the same as that explained in the first embodiment with one exception. That is, since designation for sensing a black-and-white image or a color image is performed before sensing an image at a first (initial) image formation position in the second embodiment, at the first step S1210, an image is sensed at the initial sensing position, then the obtained image data is stored in the memory area M1 of the first memory 11.

The processes at step S211 and its subsequent steps are the same as those explained in the first embodiment with reference to FIG. 4, thus explanation of those are omitted.

Figure 13:
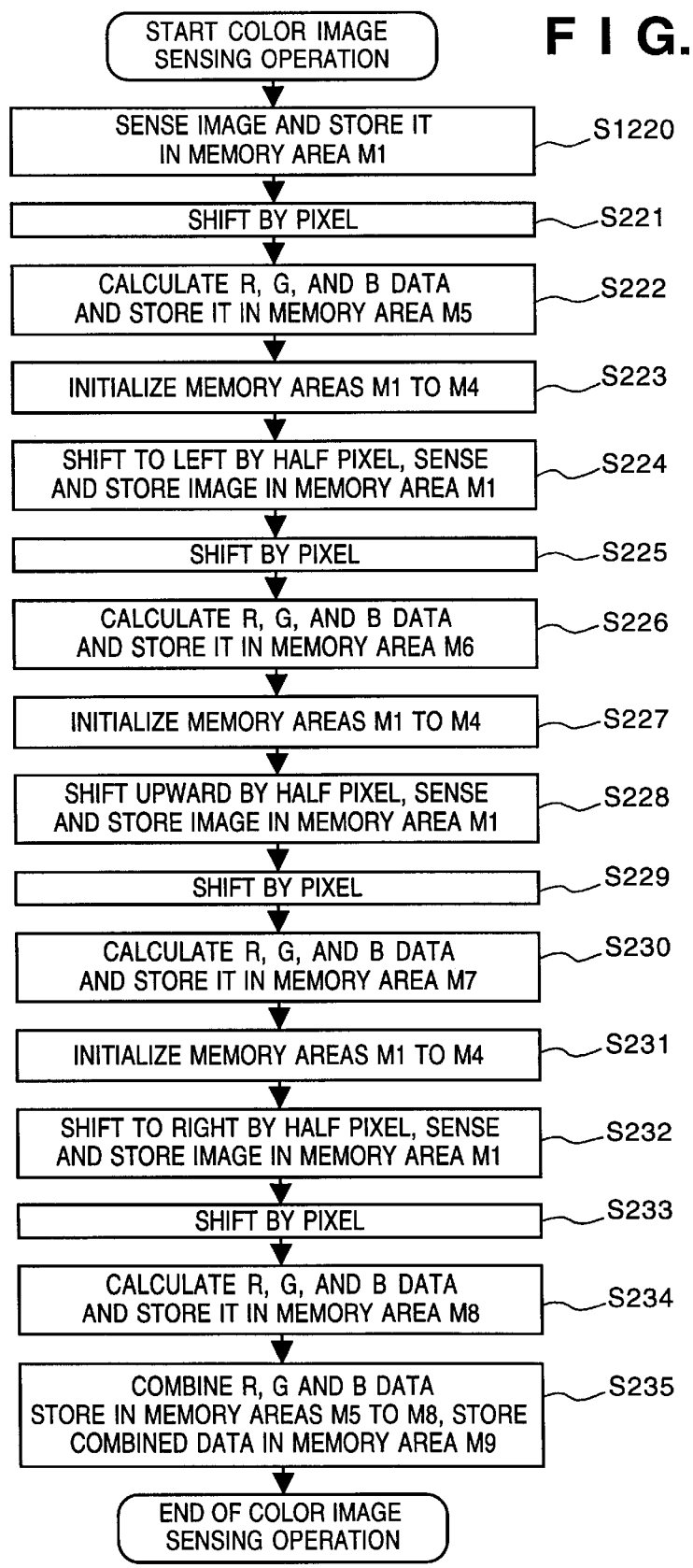
FIG. 13 is a flowchart showing processing sequence of sensing a color image.

Further, when it is judged that a color image sensing operation is designated at step S1202 in FIG. 11, the process moves to step S1204, and an operation shown in a flowchart in FIG. 13 is performed.

The pixel shifting method for sensing a color image is basically the same as the one explained in the first embodiment with one exception. That is, since designation for sensing a black-and-white image or a color image is performed before sensing an image at a first (initial) position in the second embodiment, at the first step S1220, an image is sensed at the initial sensing position as in the aforesaid process at step S1210 in FIG. 12, then the obtained image data is stored in the memory area M1 of the first memory 11.

The processes at step S221 and its subsequent steps are the same as those explained in the first embodiment with reference to FIG. 5, thus explanation of those are omitted.

Note, in the second embodiment, as the Color/BW designator 20, an electrical switch is used. However, it is possible to perform designation by using a display and an input unit, such as a keyboard and a mouse, controlled in accordance with a software.

Figure 21:
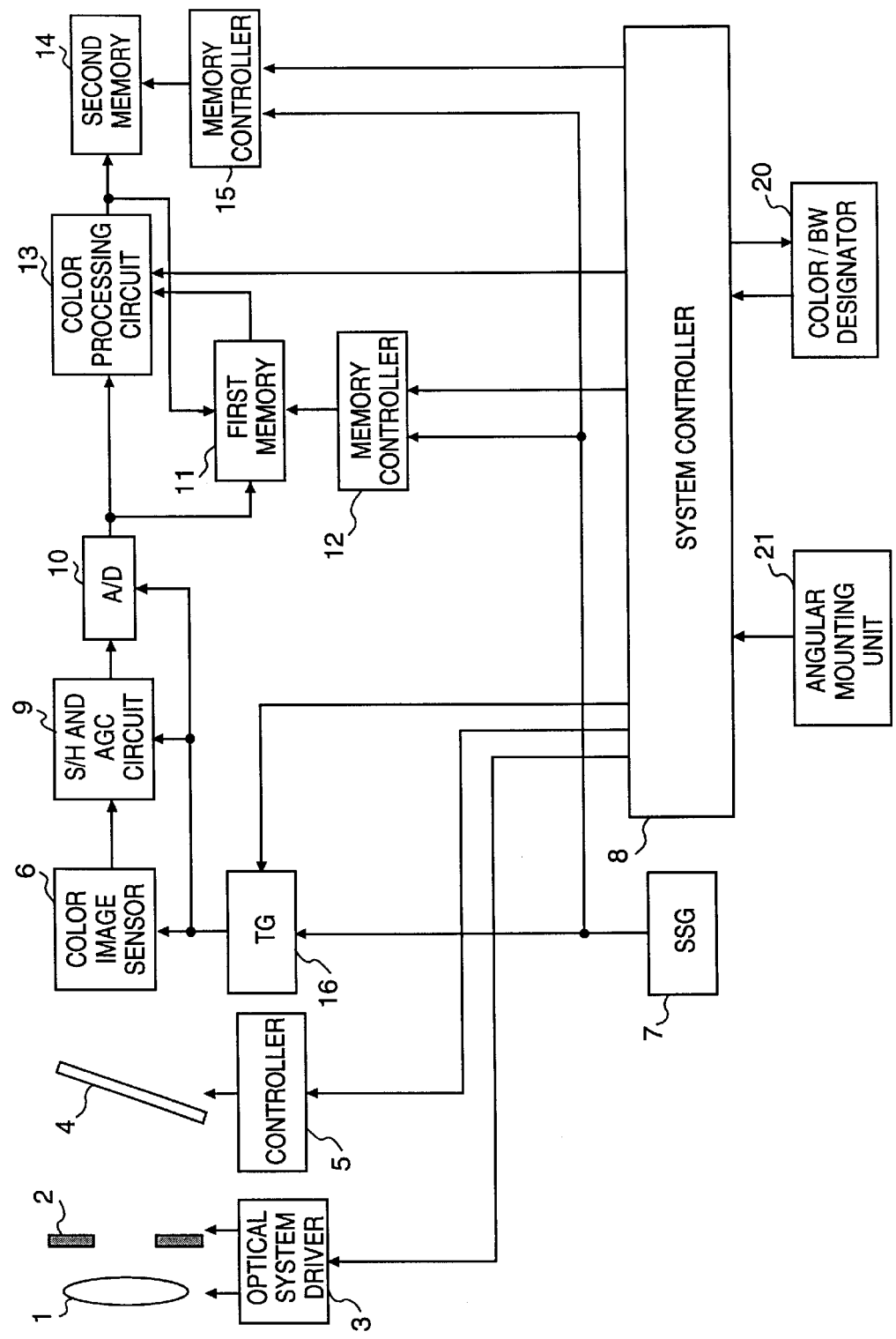
FIG. 21 is a block diagram illustrating another configuration of an image sensing apparatus according to the second embodiment.

It is also possible to provide an angular mounting unit 21 as shown in FIG. 21. To perform a color image sensing operation the image sensing unit is faced in the horizontal direction and to perform a black-and-white image sensing operation the image sensing unit is turned downward.

According to the second embodiment as described above, when it is designated to sense a black-and-white image by using the color image sensor, only the pixel shifting operation by a half pixel for increasing the resolution of an image is performed, and the pixel shifting operation by a pixel for obtaining each color component data for each pixel is not performed. In addition, when sensing a black-and-white image, a luminance component is extracted from each color component data of the complementary colors by a filter provided on the color image sensor, and a black-and-white image of high resolution is generated by using the extracted luminance signals. As a result, it is possible to reduce the number of shifts of the image formation position and the number of sensed images for obtaining a black and white image of high resolution, thereby obtaining a black-and-white image of high resolution in a shorter time period.

In the first and second embodiments, when sensing a black-and-white image, the image formation position on the color image sensor is shifted three times by a half pixel to obtain four image, then a black-and-white image of high resolution is obtained on the basis of the four images, however, the present invention is not limited to this. It is also possible to shift by less than one pixel a plurality of times and sense images, then one black-and-white image may be generated on the basis of a plurality of sensed images.

Further, when sensing a color image, sixteen images are sensed to obtain a single color image of high resolution in the first and second embodiments, however, the present invention is not limited to this. It is possible to apply known pixel shifting methods, for example.

Furthermore, in the first and second embodiments, the image formation position is shifted by shifting the light path of an incoming optical image by using a plane parallel plate, however, it is also possible to shift the image formation position by shifting the color image sensor, for example.

The present invention is not limited to the above embodiments and various changes and modifications can be made within the spirit and scope of the present invention. Therefore to appraise the public of the scope of the present invention, the following claims are made.

What is claimed is:

1. An image sensing apparatus having a color image sensor and shifting means for shifting an image formation position on said color image sensor, where said color image sensor senses an image of an object formed at each image formation position shifted by said shifting means, said apparatus comprising:
   determination means for determining whether the object is a color object for which a color image sensing operation is suitable or the object is a black-and-white object for which a black-and-white image sensing operation is suitable;
   shifting control means for controlling said shifting means to perform a first pixel shifting method so as to sense a first number of plural images to be synthesized, in a first sequence in a case where the object is a color object and to perform a second pixel shifting method so as to sense a second number of plural images to be synthesized, in a second sequence in a case where the object is a black-and-white object in accordance with a determination result by said determination means, wherein a set of images sensed in the first pixel shifting method in said first sequence is different from a set of images sensed in the second pixel shifting method in said second sequence; and
      luminance component extraction means for extracting luminance signals from color component data of each color of a filter provided on said color image sensor when the object is determined to be a black-and-white object by said determination means.

2. The image sensing apparatus according to claim 1, wherein said determination means determines whether the object is a color object or a black-and-white object by determining whether an image sensed by said color image sensor is a color image or a black-and-white image.

3. The image sensing apparatus according to claim 1, wherein, when the object is determined to be a black-and-white object by said determination means, said shifting control means controls said shifting means to shift the image formation position by less than a pixel.

4. The image sensing apparatus according to claim 3, wherein said shifting control means controls said shifting means to shift the image formation position by half pixel so as to sense four images of the object at different image formation positions.

5. The image sensing apparatus according to claim 1, wherein, when the object is determined to be a color object by said determination means, said shifting control means controls said shifting means to shift the image formation position by a pixel with respect to each of a plurality of image formation positions which are shifted by less than one pixel from each other.

6. The image sensing apparatus according to claim 5, wherein said shifting control means controls said shifting means to shift the image formation position by a pixel so a s to sense four images at different image format ion positions with respect to each of four image formation positions which are shifted by half pixel from each other, to sense the total of sixteen images.

7. The image sensing apparatus according to claim 1 further comprising color difference component averaging means for calculating an average of color difference components by summing color components of an image sensed by said color image sensor and averaging the sum by the number of the color components,
   wherein said determination means determines that the object is a color object when the average calculated by said color difference component averaging means is greater than a predetermined threshold, and that the object is a black-and-white object when the average is equal or less than the predetermined threshold.

8. The image sensing apparatus according to claim 1, wherein said shifting means shifts the image formation position on said type color image sensor by shifting the light path of an optical image of the object.

9. The image sensing apparatus according to claim 8, wherein said shifting means is a plane parallel plate.

10. The image sensing apparatus according to claim 9, wherein said shifting control means shifts the light path by rotating the plane parallel plate about two axes which are perpendicular to each other.

11. The image sensing apparatus according to claim 10, wherein said shifting control means rotates the plane parallel plate in accordance with predetermined control signals.

12. The image sensing apparatus according to claim 1, wherein said shifting means shifts the image formation position on said image sensor by moving said color image sensor.

13. The image sensing apparatus according to claim 12, wherein said shifting control means moves said color image sensor in accordance with predetermined control signals.

14. The image sensing apparatus according to claim 1 further comprising:
   color image generation means for generating a single color image by combining a plurality of images sensed by said color image sensor when the object is determined to be a color object by said determination means; and
   black-and-white image generation means for generating a single black-and-white image by combining luminance components, extracted by said luminance component extraction means, of a plurality of images sensed by said color image sensor when the object is determined to be a black-and-white object by said determination means.

15. An image sensing apparatus having a color image sensor and shifting means for shifting an image formation position on said color image sensor where said color image sensor senses an image of an object formed at each image formation position shifted by said shifting means, said apparatus comprising:
   color/black-and-white designation means for designating whether an image to be sensed is a color image or a black-and-white image;
   shifting control means for controlling said shifting means to perform a first pixel shifting method so as to sense a first number of plural images to be synthesized, in a first sequence in a case where a color image is designated by said color/black-and-white designation means and to perform a second pixel shifting method so as to sense a second number of plural images to be synthesized, in a second sequence in a case where a black-and-white image is designated by said color/black-and-white designation means, wherein a set of images sensed in the first pixel shifting method in said first sequence is different from a set of images sensed in the second pixel shifting method in said second sequence; and luminance component extraction means for extracting luminance signals from color component data for each color of a filter provided on said color image sensor when a black-and-white image is designated by said determination means.

16. The image sensing apparatus according to claim 15, wherein, when a black-and-white image is designated by said determination means, said shifting control means controls said shifting means to shift the image formation position by less than a pixel.

17. The image sensing apparatus according to claim 16, wherein said shifting control means controls said shifting means to shift the image formation position by half pixel so as to sense four images of the object at different image formation positions.

18. The image sensing apparatus according to claim 15, wherein, when a color image is designated by said determination means, said shifting control means controls said shifting means to shift the image formation position by a pixel with respect to each of a plurality of image formation positions which are shifted by less than one pixel from each other.

19. The image sensing apparatus according to claim 18, wherein said shifting control means controls said shifting means to shift the image formation position by a pixel so as to sense four images at different image formation positions with respect to each of four image formation positions which are shifted by half pixel from each other, to sense the total of sixteen images.

20. The image sensing apparatus according to claim 15, wherein said shifting means shifts the image formation position on said color image sensor by shifting a light path of an optical image of the object.

21. The image sensing apparatus according to claim 20, wherein said shifting means is a plane parallel plate.

22. The image sensing apparatus according to claim 21, wherein said shifting control means shifts the light path by rotating the plane parallel plate about two axes which are perpendicular to each other.

23. The image sensing apparatus according to claim 22, wherein said shifting control means rotates the plane parallel plate in accordance with predetermined control signals.

24. The image sensing apparatus according to claim 15, wherein said shifting means shifts the image formation position on said color image sensor by moving said color image sensor.

25. The image sensing apparatus according to claim 24, wherein said shifting control means moves said color image sensor in accordance with predetermined control signals.

26. The image sensing apparatus according to claim 15 further comprising:
color image generation means for generating a single color image by combining a plurality of images sense by said color image sensor when a color image is designated by said determination means; and
black-and-white image generation means for generating a single black-and-white image by combining luminance components, extracted by said luminance component extraction means, of a plurality of images sensed by said color image sensor when a black-and-white image is designated by said determination means.

27. The image sensing apparatus according to claim 15, wherein said color/black-and-white designation means is an electrical switch.

28. The image sensing apparatus according to claim 15, wherein said color/black-and-white designation means is implemented with a display and an input means.

29. The image sensing apparatus according to claim 15 further comprising angular mounting means for changing the direction of the image sensing apparatus,
wherein said shifting control means controls said shifting means to shift for a color image sensing operation when the image sensing apparatus is faced in the horizontal direction and to shift for a black-and-white image sensing operation when the image sensing apparatus is faced downward.

30. An image sensing method comprising:
an image sensing step of sensing a color image by a color image sensor at an initial image formation position of the color image sensor;
a color difference averaging step of calculating the average of color difference components by summing color difference components of all over the color image sensed at said image sensing step and dividing the sum by the number of color difference components;
a determination step of determining whether the average of the color difference components calculated at said color difference averaging step is greater than a predetermined threshold or not;
a color image sensing step of sensing a color image in a first pixel shifting method so as to sense a first number of plural images to be synthesized, in a first sequence when it is determined that the average of the color difference components is greater than the predetermined threshold; and
a black-and-white image sensing step of sensing a black-and-white image in a second pixel shifting method so as to sense a second number of plural images to be synthesized, in a second sequence when it is determined that the average of the color difference components is equal or less than the predetermined threshold,
wherein a set of images sensed in the first pixel shifting method in said first sequence is different from a set of images sensed in the second pixel shifting method in said second sequence.

31. The image sensing method according to claim 30, wherein, at said black-and-white image sensing step, four images of an object is sensed at different image formation positions, luminance components of these four images are extracted, then a black-and-white image is obtained by combining the luminance components.

32. An image sensing method comprising:
a determination step of determining whether a color image is designated to be sensed or a black-and-white image is designated to be sensed;
a color image sensing step of sensing a color image when it is designated that a color image is to be sensed using a first pixel shifting method so as to sense a first number of plural images to be synthesized, in a first sequence; and
a black-and-white image sensing step of sensing a black-and-white image using a second pixel shifting method so as to sense a second number of plural images to be synthesized, in a second sequence when it is designated that a black-and-white image is to be sensed,
wherein a set of images sensed in the first pixel shifting method in said first sequence is different from a set of images sensed in the second pixel shifting method in said second sequence.

33. The image sensing method according to claim 32, wherein, at said black-and-white image sensing step, four images of an object is sensed at different image formation positions, luminance components of these four images are extracted, then a black-and-white image is obtained by combining the luminance components.

34. The image sensing method according to claim 32, wherein said determination step is performed on the basis of an operation state of an electrical switch.

35. An image pickup apparatus comprising:

switching means for switching between a color image pickup mode and a monochromatic image pickup mode; and image pickup means for picking up a plurality of images to be synthesized, in a first sequence using a first image shifting method by shifting positions of an optical image on said image pickup means when said switching means switches to said color image pickup mode, and for picking up a plurality of images to be synthesized, in a second sequence using a second image shifting method, different from said first image shifting method, when said switching means switches to said monochromatic image pickup mode, wherein a set of images sensed in the first pixel shifting method in said first sequence is different from a set of images sensed in the second pixel shifting method in said second sequence.

36. The image pickup apparatus according to claim 35, wherein said switching means performs switching on the basis of color information of an object.

37. The image pickup apparatus according to claim 35, wherein said switching means performs switching on the basis of operation of an operation member.

38. The image pickup apparatus according to claim 35, wherein a shift amount in the first image shifting method is different from a shift amount in the second image shifting method.

39. The image pickup apparatus according to claim 35, wherein a number of shifting operations performed in the first image shifting method is different from a number of shifting operations performed in the second image shifting method.

* * * * *